(12) United States Patent
Scheps

(10) Patent No.: US 6,539,041 B1
(45) Date of Patent: Mar. 25, 2003

(54) COMPACT SOLID STATE DYE LASER

(75) Inventor: Richard Scheps, Rancho Santa Fe, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/539,460

(22) Filed: Mar. 30, 2000

(51) Int. Cl.[7] .............................. H01S 3/10; H01S 5/00; H01S 3/70
(52) U.S. Cl. .............................. 372/53; 372/50; 372/21; 372/22
(58) Field of Search .............................. 372/53, 21, 22

(56) References Cited

U.S. PATENT DOCUMENTS

| | | | |
|---|---|---|---|
| 3,996,525 A | * | 12/1976 | Hughes et al. .............. 331/94.5 |
| 4,139,342 A | | 2/1979 | Sheldrake et al. |
| 5,222,092 A | | 6/1993 | Hench et al. |
| 5,329,540 A | | 7/1994 | Lee et al. |
| 5,356,667 A | | 10/1994 | Hench et al. |
| 5,463,649 A | * | 10/1995 | Ashby et al. .............. 372/40 |
| 5,610,932 A | * | 3/1997 | Kessler et al. .............. 372/39 |
| 5,805,623 A | | 9/1998 | Utano et al. |
| 5,832,010 A | * | 11/1998 | Fulbert et al. .............. 372/22 |
| 5,844,932 A | | 12/1998 | Thony et al. |

* cited by examiner

*Primary Examiner*—Paul Ip
*Assistant Examiner*—Armando Rodriguez
(74) *Attorney, Agent, or Firm*—Andrew J. Cameron; James A. Ward; Michael A. Kagan

(57) ABSTRACT

A novel apparatus is described for a compact solid state dye laser that includes a solid state laser gain element for generating laser pump energy, a passive Q-switch for generating high intensity bursts of laser pump energy, a frequency doubler for generating dye laser pump energy, and a solid state laser dye element for generating optical energy output.

17 Claims, 1 Drawing Sheet

COMPACT SOLID STATE DYE LASER

The invention described below is assigned to the United States Government and is available for licensing commercially. Technical and licensing inquiries may be directed to Harvey Fendelman, Legal Counsel For Patents, SPAWARSYSCEN SAN DIEGO, CODE D0012 Room 103, 53510 Silvergate Ave Rm 103, San Diego, Calif. 92152-5765; telephone no. (619)553-3818; fax no. (619)553-3821.

BACKGROUND OF THE INVENTION

The present invention relates generally to lasers and more specifically to dye lasers.

Dye lasers typically use a dye dissolved in a liquid solvent and are pumped by ion lasers such as argon lasers, which suffer the disadvantage of low efficiency. Also, laser dyes in pure or liquid solution form are generally carcinogenic, and the solvents used with laser dyes are often flammable as well as carcinogenic and their disposal presents a toxic waste problem.

A solid state dye laser host is described by Kessler et al. in U.S. Pat. No. 5,610,932 issued on Mar. 11, 1997. In Kessler, a polyacrylamide host is doped with a laser dye and encapsulated within a solid container. The container is placed between two feedback mirrors and is pumped by a Nd:YAG laser. A disadvantage of this arrangement is its inherently low optical efficiency.

A monolithic switched microlaser is described in U.S. Pat. No. 5,832,010 issued on Nov. 3, 1998 to Fulbert et al. This monolithic structure of this device limits the extent of its applications.

SUMMARY OF THE INVENTION

A compact solid state dye laser of the present invention comprises a solid state laser gain element for generating laser pump energy, a passive Q-switch for generating high intensity bursts of laser pump energy, a frequency doubler for generating dye laser pump energy, and a solid state laser dye element for generating optical energy output.

An advantage of the compact solid state dye laser of the present invention is a higher conversion efficiency may be obtained than that of conventional dye lasers.

Another advantage is that the present invention may be implemented in an all solid state, monolithic, tunable dye laser in a field-portable, compact, battery powered structure.

Still another advantage is that the laser dye may be embedded in an inert matrix that protects the user and the environment from toxic exposure.

Yet another advantage is that the dye laser of the present invention may be modulated at high repetition rates.

Another advantage is that the dye laser of the present invention has low sensitivity to alignment sensitivities.

DESCRIPTION OF THE INVENTION

Figure 1:
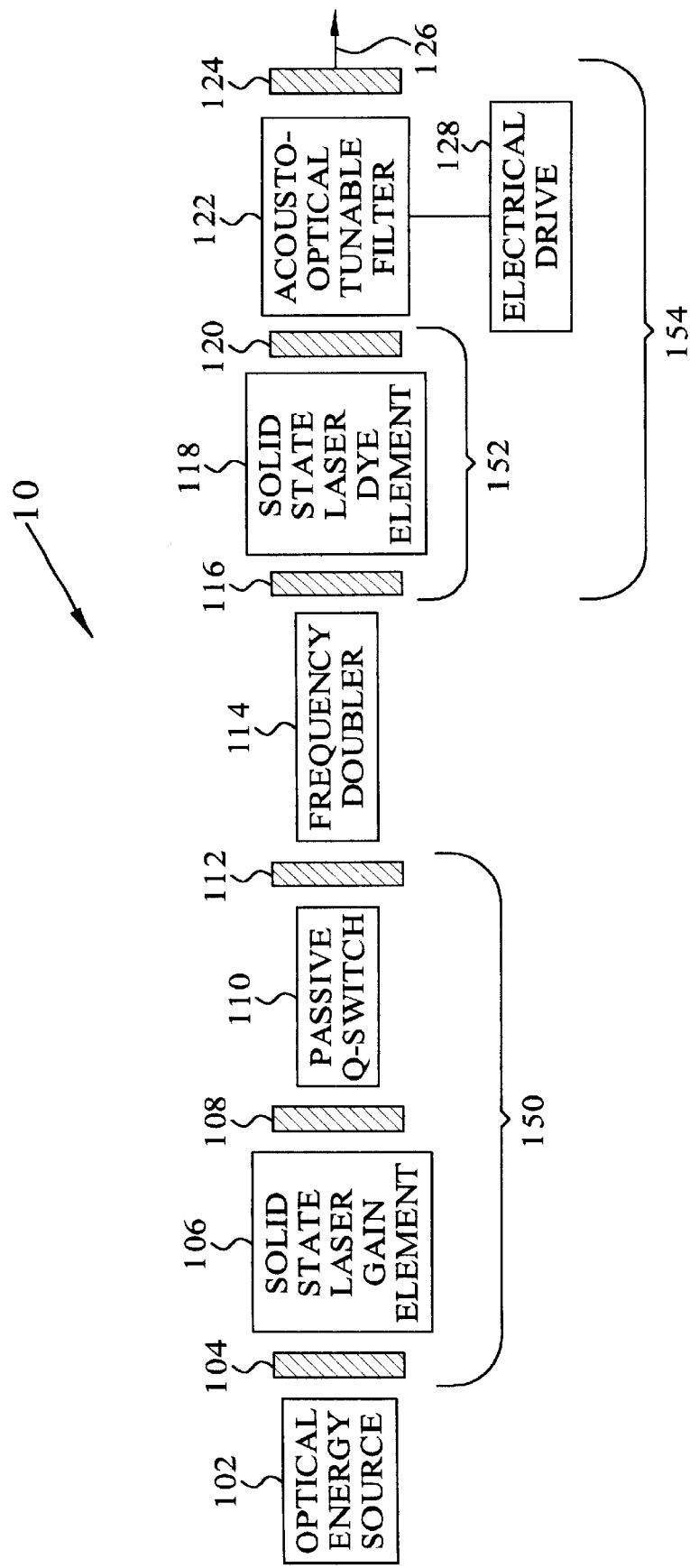
FIG. 1 is a diagram of a compact solid state dye laser of the present invention.

FIG. 1 shows a diagram of an exemplary compact solid state dye laser 10 of the present invention. Optical energy source 102 generates a focused or imaged beam of excitation pump energy in solid state laser gain element 106. Optical energy source 102 may be, for example, an infrared single stripe laser diode such as a Sony model SLD304V. The excitation pump energy output from optical energy source 102 may be directly coupled to laser gain element 106 or indirectly coupled by a relay lens such as a graded refraction index lens (GRIN) or other lens arrangements according to techniques well known in the art to focus or image a beam of excitation pump energy to pump laser gain element 106. A laser resonant cavity 150 is determined at the input end by optical coating 104. Optical coating 104 is preferably highly reflective at the laser pump energy wavelength output by a laser gain element 106 and highly transmissive at the wavelength of the excitation pump energy. Optical coating 104 and other optical coatings described below may be, for example, multilayered dielectric coatings made according to techniques that are well known in the art. Laser gain element 106 may be made of a crystal or glass doped with rare earth or transition element ions according to techniques well known in the art. Laser gain element 106 is coupled to passive Q-switch 110. Passive Q-switch 110 may be made from $Cr^{4+}$:YAG or a solid state host such as PMMA (Plexiglass) or ORMISIL (Sol-gel) doped with a saturable laser dye according to techniques well known in the art. Optical coating 108 is preferably highly transmissive at the laser pump energy wavelength. Q-switch 110 is coupled to a frequency doubler crystal 114 made of, for example, potassium titanyl phosphate (KTP) or lithium niobate oriented with respect to the crystalline axes to provide high conversion efficiency according to techniques well known in the art. Laser resonant cavity 150 is determined at the output end by optical coating 112. Optical coating 112 is preferably partially reflective at the laser pump energy wavelength, highly reflective at the excitation pump energy wavelength, and highly reflective at the dye laser pump energy wavelength output from frequency doubler 114. Frequency doubler 114 is coupled to a solid state laser dye element 118 made with, for example, a pyrromethene dye such as PM570. A solid state dye laser resonant cavity 152 is defined at the input end by optical coating 116. Optical coating 116 is preferably highly transmissive at the dye laser pump energy wavelength and highly reflective at the optical output energy wavelength. Solid state dye laser resonant cavity 152 is determined at the output end by an optical coating 120 that is preferably partially reflective at the optical output energy wavelength.

Alternatively, an acousto-optic filter 122 may be inserted within an extended dye laser resonant cavity 154, in which case optical coating 120 is preferably highly transmissive at the optical output energy wavelength, and optical coating 124 is preferably partially reflective at the optical output energy wavelength. Electrical drive 128 may be included to vary the wavelength of optical output energy 126 by acousto-optic filter 128.

In operation, optical energy source 102 pumps laser gain element 106, which outputs laser pump energy to Q-switch 110. Q-switch 110 generates bursts of high intensity laser pump energy that are input to frequency doubler 114. Frequency doubler 114 outputs dye laser pump energy to solid state laser dye element 118. Dye laser pump energy output by frequency doubler 114 may have a wavelength in the visible range, for example 532 nm. Laser dye element 118 receives the dye laser pump energy from frequency doubler 114 and outputs optical energy 126 at the characteristic wavelength of laser dye element 118. If tunable acousto-optic filter 122 is included, then a desired wavelength for optical energy 126 may be selected by acousto-optic filter 122. An appropriate electrical drive 128 to acousto-optic filter 122 may also be provided to vary the wavelength of optical energy 126.

As an alternative to acousto-optic filter 122, the wavelength of optical energy 126 may be selected by making optical coating 116 highly reflective at the selected wavelength of optical energy 126 and making optical coating 120 partially reflective at the selected wavelength of optical energy 126.

Optical energy source 102, solid state laser gain element 106, passive Q-switch 110, frequency doubler 114, solid state dye laser element 118, and acousto-optic tunable filter 122 may be glued or diffusion bonded together according to well known techniques to make the entire structure monolithic. Alternatively, subsets of these elements may be glued or diffusion bonded to make the structure partially monolithic.

Various modifications and variations of the present invention may be possible within the spirit and scope of the following claims to practice the invention otherwise than described above to serve a variety of applications.

I claim:

1. A solid state dye laser comprising:
   a solid state laser gain element for generating laser pump energy having a laser pump energy wavelength;
   a passive Q-switch coupled to the laser gain element for generating high intensity bursts of laser pump energy;
   a nonlinear crystal frequency doubler coupled to the passive Q-switch for generating dye laser pump energy having a dye laser pump energy wavelength;
   a solid state laser dye element coupled to the frequency doubler for generating optical energy output having an optical energy output wavelength;
   an acousto-optic tunable filter coupled to the solid state laser dye element for selecting a desired wavelength for the optical energy output; and
   wherein the laser gain element, the passive Q-switch, the frequency doubler, the acousto-optic tunable filter and the solid state laser dye element are embodied as a monolithic structure.

2. The solid state dye laser of claim 1 further comprising an optical energy source coupled to the laser gain element for generating excitation pump energy.

3. The solid state dye laser of claim 2 further comprising an optical coating coupled to the optical energy source and the laser gain element that is highly reflective at the laser pump energy wavelength and highly transmissive at the excitation pump energy wavelength.

4. The solid state dye laser of claim 1 further comprising an optical coating coupled to the laser gain element and the passive Q-switch that is highly transmissive at the laser pump energy wavelength.

5. The solid state dye laser of claim 2 further comprising an optical coating coupled to the passive Q-switch and the frequency doubler that is partially reflective at the laser pump energy wavelength, highly reflective at the excitation pump energy wavelength, and highly reflective at the dye laser pump energy wavelength.

6. The solid state dye laser of claim 1 further comprising an optical coating coupled to the frequency doubler and the solid state dye laser that is highly transmissive at a wavelength of the dye laser pump energy and highly reflective at the optical output energy wavelength.

7. The solid state dye laser of claim 1 further comprising an optical coating coupled to the solid state dye laser that is partially reflective at the optical output energy wavelength.

8. The solid state dye laser of claim 1 further comprising an optical coating coupled to the solid state dye laser and the acousto-optic filter that is highly transmissive at the optical output energy wavelength.

9. The solid state dye laser of claim 1 further comprising an optical coating coupled to the acousto-optic filter that is partially reflective at the optical output energy wavelength.

10. The solid state dye laser of claim 1 wherein the laser gain element is made of one of crystal and glass doped with one of rare earth and transition element ions.

11. The solid state dye laser of claim 1 wherein the passive Q-switch is made of one of Cr4+:YAG and a solid state host doped with saturable absorber dye.

12. The solid state dye laser of claim 1 wherein the frequency doubler is made of one of lithium niobate and potassium titanyl phosphate.

13. The solid state dye laser of claim 1 wherein the solid state laser dye element comprises a pyrromethene dye.

14. The solid state dye laser of claim 1 wherein the laser gain element, the passive Q-switch, the frequency doubler, and the solid state laser dye element are optically bonded by a glue.

15. The solid state dye laser of claim 1 wherein at least two of the laser gain element, the passive Q-switch, the frequency doubler, and the solid state laser dye element are optically bonded by diffusion bonding.

16. The solid state dye laser of claim 9 wherein the acousto-optic tunable filter is optically bonded by one of glue and diffusion bonding to the solid state laser dye element.

17. A solid state dye laser comprising:
   a solid state laser gain element for generating laser pump energy;
   a passive Q-switch coupled to the laser gain element for generating high intensity bursts of laser pump energy having a laser pump energy wavelength;
   a nonlinear crystal frequency doubler coupled to the passive Q-switch for generating dye laser pump energy having a dye laser pump energy wavelength;
   a solid state laser dye element coupled to the frequency doubler for generating optical energy output having an optical energy output wavelength;
   an optical energy source coupled to the solid state laser gain element for generating excitation pump energy having an excitation pump energy wavelength;
   an acousto-optic tunable filter coupled to the solid state laser dye element for selecting the optical energy output wavelength;
   an optical coating coupled to the laser gain element that is highly reflective at the laser gain element output wavelength and highly transmissive at the excitation pump energy wavelength;
   an optical coating coupled to the laser gain element and the passive Q-switch that is highly transmissive at the laser pump energy wavelength;
   an optical coating coupled to the passive Q-switch and the frequency doubler that is partially reflective at the laser pump energy wavelength, highly reflective at the excitation pump energy wavelength, and highly reflective at the dye laser pump energy wavelength;
   an optical coating coupled to the frequency doubler and the solid state laser dye element that is highly transmissive at the dye laser pump energy wavelength and highly reflective at the optical output energy wavelength;

an optical coating coupled to the solid state laser dye element and the acousto-optic filter that is highly transmissive at the optical output energy wavelength;

and an optical coating coupled to the acousto-optic filter that is partially reflective at the optical output energy wavelength wherein:

the laser gain element is made of one of crystal and glass doped with one of rare earth and transition element ions;

the passive Q-switch is made of one of Cr4+:YAG and a solid state host doped with saturable absorber dye;

the frequency doubler is made of one of lithium niobate and potassium titanyl phosphate;

the solid state laser dye element comprises a pyrromethene dye;

and the laser gain element, the passive Q-switch, the frequency doubler, the solid state laser dye element, and the acousto-optic tunable filter are embodied as a monolithic structure.

* * * * *